(12) United States Patent
Valles et al.

(10) Patent No.: US 8,727,151 B2
(45) Date of Patent: May 20, 2014

(54) ASSEMBLY OF A CONTAINER AND A CLOSURE

(75) Inventors: Vanessa Valles, Hasselt (BE); Daniël Peirsman, Bornem (BE); Sarah Vanhove, Boutersem (BE)

(73) Assignee: Anheuser-Busch Inbev S.A. (BE)

( * ) Notice: Subject to any disclaimer, the term of this patent is extended or adjusted under 35 U.S.C. 154(b) by 235 days.

(21) Appl. No.: 12/863,051

(22) PCT Filed: Jan. 15, 2009

(86) PCT No.: PCT/EP2009/050444
§ 371 (c)(1),
(2), (4) Date: Oct. 19, 2010

(87) PCT Pub. No.: WO2009/090225
PCT Pub. Date: Jul. 23, 2009

(65) Prior Publication Data
US 2011/0024438 A1 Feb. 3, 2011

(30) Foreign Application Priority Data
Jan. 15, 2008 (EP) .................................. 08100514

(51) Int. Cl.
*B65D 51/16* (2006.01)
(52) U.S. Cl.
CPC ................................. *B65D 51/1661* (2013.01)
USPC ........... 215/260; 215/307; 215/207; 215/293; 215/316; 215/317; 215/358; 220/784; 220/785; 220/366.1; 220/367.1

(58) Field of Classification Search
CPC .... B65D 47/127; B65D 51/16; B65D 51/228; B65D 51/224; B65D 51/18; B65D 51/1661
USPC ............ 220/785, 784, 366.1, 367.1; 215/307, 215/293, 358, 224, 260, 318, 207, 252
See application file for complete search history.

(56) References Cited

U.S. PATENT DOCUMENTS

| | | | | |
|---|---|---|---|---|
| 1,163,805 A | * | 12/1915 | Bonn | ............................ 215/319 |
| 1,694,851 A | | 12/1928 | Glass | |
| 2,050,799 A | * | 8/1936 | Landau | ......................... 215/253 |
| 2,070,377 A | * | 2/1937 | Simmons | ...................... 215/260 |
| 2,085,392 A | | 6/1937 | Reichel | |
| 2,364,678 A | * | 12/1944 | White | ............................ 215/352 |
| 2,467,979 A | | 4/1949 | Krueger | |
| 3,047,177 A | * | 7/1962 | Poitras et al. | .................. 215/260 |
| 3,144,154 A | * | 8/1964 | Puse et al. | ...................... 215/260 |
| 3,348,728 A | | 10/1967 | Love | |
| 3,393,816 A | * | 7/1968 | Grimm | ......................... 215/223 |
| 3,393,818 A | * | 7/1968 | McIntosh | ...................... 215/260 |

(Continued)

FOREIGN PATENT DOCUMENTS

DE 814258 C 9/1951
DE 969306 C 5/1958

(Continued)

*Primary Examiner* — Robert J Hicks
*Assistant Examiner* — Gideon Weinerth
(74) *Attorney, Agent, or Firm* — Brooks Kushman P.C.

(57) ABSTRACT

An assembly of a container and a closure, the assembly having an overpressure relief system, wherein the system has a fixation between the closure and a container, the fixation providing two positions in between which the closure is movable.

8 Claims, 4 Drawing Sheets

(56) References Cited

U.S. PATENT DOCUMENTS

| | | | |
|---|---|---|---|
| 3,398,848 A * | 8/1968 | Donovan | 215/224 |
| 3,434,614 A * | 3/1969 | Moller | 215/224 |
| 3,438,529 A * | 4/1969 | Lohrer | 215/320 |
| 3,450,254 A | 6/1969 | Miles | |
| 3,484,011 A | 12/1969 | Greenhalgh et al. | |
| 3,627,160 A * | 12/1971 | Horvath | 215/223 |
| 3,628,681 A | 12/1971 | Schwartz | |
| 3,760,969 A | 9/1973 | Shimamoto et al. | |
| 3,901,401 A * | 8/1975 | Lynn et al. | 215/223 |
| 3,907,146 A * | 9/1975 | Fields | 215/317 |
| 3,933,265 A * | 1/1976 | Karlan | 215/260 |
| 3,934,745 A * | 1/1976 | Lovell | 215/224 |
| 3,966,071 A * | 6/1976 | Northup | 215/260 |
| 3,980,194 A * | 9/1976 | Costa | 215/223 |
| 4,071,156 A * | 1/1978 | Lowe | 215/224 |
| 4,159,790 A | 7/1979 | Bailey | |
| 4,330,066 A | 5/1982 | Berliner | |
| 4,365,721 A * | 12/1982 | Montgomery | 215/217 |
| 4,500,006 A * | 2/1985 | Lafortune et al. | 215/224 |
| 4,635,814 A | 1/1987 | Jones | |
| 4,694,968 A * | 9/1987 | Proctor et al. | 215/224 |
| 4,700,860 A * | 10/1987 | Li | 215/256 |
| 4,892,230 A | 1/1990 | Lynn, Jr. | |
| 4,984,713 A | 1/1991 | Chambers et al. | |
| 5,031,787 A * | 7/1991 | Ochs | 215/276 |
| 5,062,538 A * | 11/1991 | Ochs | 215/260 |
| 5,292,017 A * | 3/1994 | Reifers | 215/206 |
| 5,328,063 A | 7/1994 | Beck et al. | |
| 5,368,178 A * | 11/1994 | Towns et al. | 215/317 |
| 5,435,460 A | 7/1995 | Osgar | |
| 5,455,124 A * | 10/1995 | Schollenberger | 429/53 |
| 5,769,268 A | 6/1998 | Kuzma et al. | 220/780 |
| 5,788,196 A | 8/1998 | Forman | |
| 5,810,185 A | 9/1998 | Groesbeck | |
| 5,853,096 A | 12/1998 | Bartur et al. | |
| 5,904,965 A | 5/1999 | Noel | |
| 5,934,500 A | 8/1999 | Cogger et al. | |
| 6,021,912 A * | 2/2000 | Hertrampf | 215/344 |
| 6,158,604 A * | 12/2000 | Larguia et al. | 215/217 |
| 6,161,716 A * | 12/2000 | Oberhofer et al. | 220/203.04 |
| 6,202,871 B1 * | 3/2001 | Kelly | 215/307 |
| 6,220,311 B1 | 4/2001 | Litto | |
| 6,230,922 B1 | 5/2001 | Rasche et al. | |
| 6,679,395 B1 * | 1/2004 | Pfefferkorn et al. | 215/307 |
| 6,716,396 B1 | 4/2004 | Anderson et al. | |
| 6,848,599 B2 | 2/2005 | Hammarth et al. | |
| 7,111,763 B2 | 9/2006 | Masuda | |
| 7,314,146 B2 * | 1/2008 | Mavin | 215/307 |
| 7,367,479 B2 | 5/2008 | Sitz | |
| 7,819,286 B2 | 10/2010 | Antheil et al. | |
| 2001/0017306 A1 | 8/2001 | Wan et al. | |
| 2003/0089735 A1 | 5/2003 | Iwatsubo | |
| 2004/0060598 A1 | 4/2004 | Danby et al. | |
| 2006/0144870 A1 | 7/2006 | Anderson | |
| 2007/0257002 A1 * | 11/2007 | Pucci | 215/252 |
| 2008/0093328 A1 * | 4/2008 | Gaillot et al. | 215/307 |
| 2009/0008356 A1 | 1/2009 | Gadzic et al. | |
| 2009/0057347 A1 | 3/2009 | Leys et al. | |
| 2010/0187230 A1 | 7/2010 | Beer et al. | |
| 2011/0100950 A1 * | 5/2011 | Graux et al. | 215/355 |
| 2011/0174760 A1 * | 7/2011 | Luzzato et al. | 215/252 |

FOREIGN PATENT DOCUMENTS

| | | |
|---|---|---|
| EP | 1138609 A1 | 10/2001 |
| EP | 1245499 A1 | 10/2002 |
| EP | 1614636 A1 | 1/2006 |
| GB | 1074165 | 6/1967 |
| GB | 1545293 | 5/1979 |
| GB | 2426508 A | 11/2006 |
| WO | 9743188 A1 | 11/1997 |
| WO | 9807575 A1 | 2/1998 |
| WO | 0132525 A1 | 5/2001 |

* cited by examiner

ASSEMBLY OF A CONTAINER AND A CLOSURE

FIELD OF THE INVENTION

The present invention generally relates to an assembly of a container and a closure for sealing an opening in said container, particularly to such an assembly comprising an overpressure relief system.

BACKGROUND OF THE INVENTION

It is generally known that containers for storing carbonated beverages necessitate an overpressure relief system. Such an overpressure relief system has the aim to prevent uncontrolled burst of the container or closure or an uncontrolled ejection of a valve or closure fixed thereto. Existing overpressure relief systems included containers having weakened spots in their body so as to allow a controlled burst in case of overpressure of the use of overpressure valves. With the increasing interest in home appliances, containers with weakened spots in their body have become undesirable, while valves are considered as expensive and as such also undesired. Accordingly, overpressure relief systems have been incorporated in the closure of containers.

Overpressure release systems are described in the art. For example EP-A-1 614 636 and U.S. Pat. No. 5,328,063 both disclose a closure comprising a mount piece that is snap fitted on a container and defining an outflow opening thereof. Centrally in the outflow opening is provided a stem that is an integral part of the mount piece. The closure further comprises a closure cap fixed to the mount piece, the closure cap comprising a flexible diaphragm sealing an outlet of the container and having a free edge that engages the stem. When overpressure occurs in the container, the flexible diaphragm deforms and an opening is created between the stem and the free end of the diaphragm, thereby allowing overpressure relief.

A drawback of the prior art closures incorporating an overpressure relief system is that the essentially comprise a flexible diaphragm, which clearly limits design options with respect to access control by example given piercing. Another drawback is that said closures comprise different materials, in particular a rigid portion for the fixation of the closure to the mount piece of container and a flexible portion for allowing overpressure relief. Hence, the manufacturing and recycling of the known closures is relatively complicated and expensive.

SUMMARY OF THE INVENTION

The present invention concerns an assembly of a container and a closure, the assembly comprising an overpressure relief system, characterized in that the system comprises a fixation between the closure and a container, the fixation comprising two fixation positions in between which the closure is movable.

Said fixation preferably comprising a first fixation position wherein the closure seals the opening of the container.

Said fixation preferably comprising a second fixation position wherein the sealing between the closure and the container is disrupted, thereby allowing pressure relief.

According to a preferred embodiment of the assembly according the invention, the fixation comprises a snap fit.

It is particularly preferred the container comprises a neck portion that is provided with at least two sets of outwardly extending protrusions, both sets being provided at a different level.

Further it is preferred that the closure comprises a base part and a skirt extending transversally with respect to the base, the skirt—that preferably is a continuous cylinder—comprising at least one set of inwardly directed protrusions configured to snap fit the closure behind one of the sets of protrusions on the containers neck portion.

DESCRIPTION OF THE INVENTION

An assembly of a container and closure in accordance with the invention has the advantage that the overpressure relief system is situated at the level of fixation of the closure on the container. As such the area of the closure that usually plays a role in access control to the container is not involved in the pressure relief system and no special provisions are necessitated at this area, resulting in greater design flexibility than in the known closures provided with overpressure relief systems.

Another advantage is that the overpressure relief system incorporated in the assembly according the present invention includes two fixation positions of the closure onto the container, whereby the closure is moved between both positions upon activation of the pressure relief system. Hence, the present assembly does not necessitate high flexible materials to allow pressure relief and the closure can be manufactured in one single material, thereby allowing cost reduction and facilitating recycling.

BRIEF DESCRIPTION OF THE DRAWINGS

In order to better explain the characteristics of the invention, the following preferred embodiments of an assembly according to the invention is given as an example only without being limitative in any way, with reference to the accompanying drawings, in which.

DETAILED DESCRIPTION OF EMBODIMENT(S)

Figure 1:
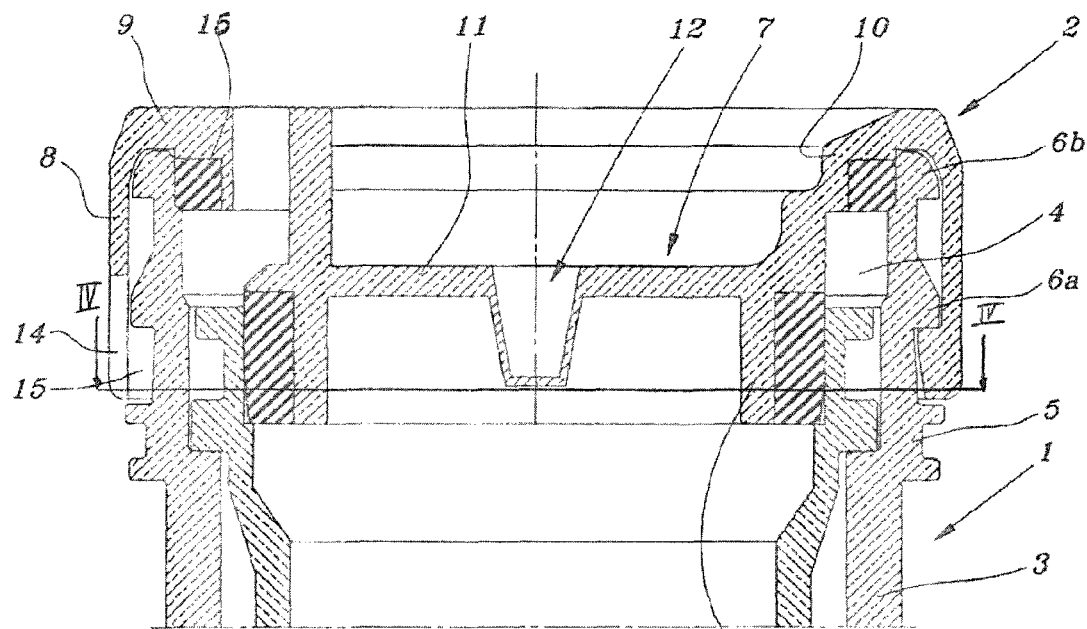
FIG. 1 represents a cross section of an assembly according the present invention.

FIG. 1 represents an assembly according to the present invention, the assembly comprising a container 1 and a closure 2 fixed thereon.

The container 1 is provided with a neck portion 3 defining an opening 4 in the container 1. In the represented embodiment, the neck portion 3 comprises a cylindrical wall part 5 whereon are provided at least two sets 6a and 6b of outwardly extending protrusions, both sets being provided at a different level of the neck portion 3.

The different protrusions of a single set 6a or 6b are preferably positioned in an annular configuration and on a same level of the neck portion 3 and can be mutually spaced-apart or can form a continuous annular rim.

The closure 2 comprises a base 7 and a skirt 8 extending transversally with respect to the general plane of the base 7.

The base 7 is provided with a hub 9 having a peripheral edge extending into the skirt 8. At the inner edge of the hub 9 is provided a cylindrical wall 10 portion extending in a same direction as the skirt 8, which cylindrical wall portion 10 is fixed to a circular disc 11. In the present embodiment, this disc comprises a wedged area 12, defining an access port to the opening 4 of the container 1.

Concentrically around the wedged area 12, a further cylindrical wall portion 13 is provided on said disc 11, the further wall portion 13 extending in a same sense as the skirt 8 and having a diameter that is smaller than the diameter of the disc 11.

Turning now to the skirt 8, it is noted that the skirt comprises several spaced-apart members 14 extending transversally with respect to the base 7, these members 14 being provided with an inwardly directed protrusion 15 at their free end. These protrusions 15 together form a set of protrusions 15 configured to cooperate in a snap fit relation with each of both sets of protrusions 6a and 6b on the neck portion 3 of the container 1.

In an assembled state, the closure 2 is provided onto the containers neck portion 3, such that the set of protrusions 15 of the closure 2 is snap fitted behind the set of protrusions 6a on the neck portion 3, situated closest to the containers body. In this fixation position, the hub 9 closely fits to the free edge of the neck portion 3, while a sealing member 16 provided between the hub 9 and said free edge ensures that the opening 4 is properly sealed by the closure 2.

According to the invention the assembly of container 1 and closure 2 comprises an overpressure relief system comprising a fixation between the closure 2 and the container 1, said fixation comprising two positions in between which the closure 2 is movable.

In the represented embodiment, the overpressure relief system comprises both sets of protrusions 6a and 6b of the neck portion 3 as well as the skirt 8 and the corresponding set of protrusions 15.

In the above configuration of the assembly according to the invention, a first fixation position is the one wherein the set of protrusions 15 located on the skirt 8 are snap fitted (i.e. clamped) behind the set of protrusions 6a located closest to the containers body and wherein the closure 2 seals said opening 4 of the container 1.

Figure 2:
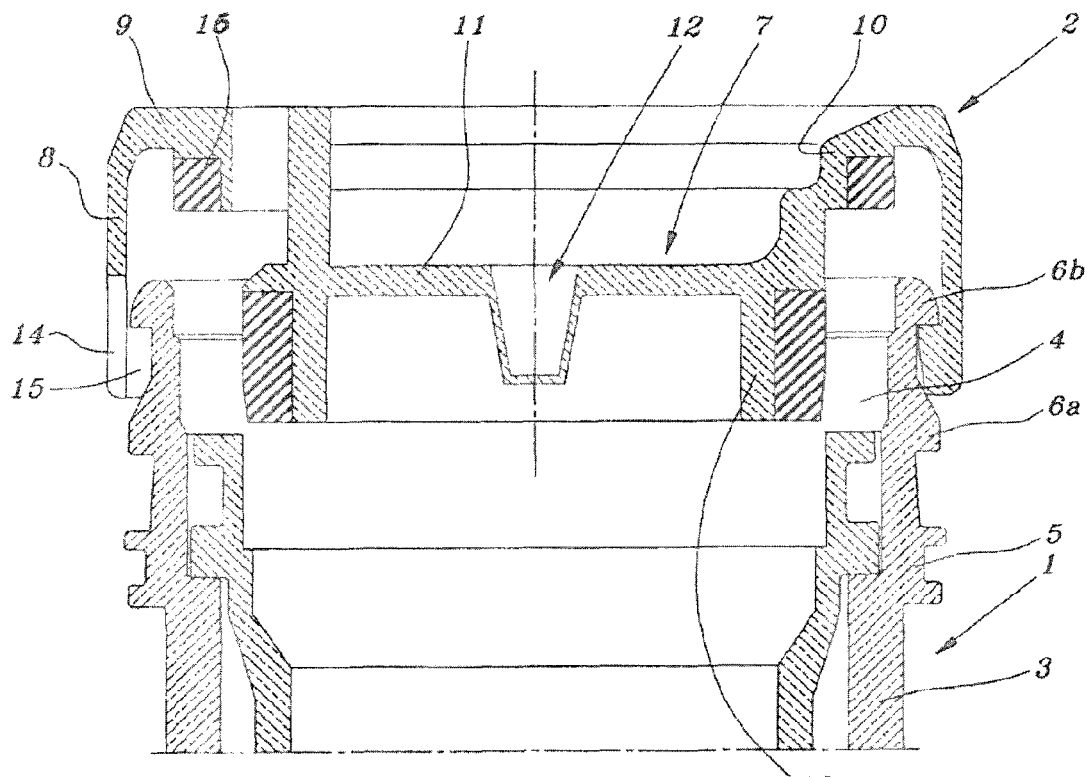
FIG. 2 represents a corresponding cross section of the assembly as FIG. 1, though in another fixation position of the closure on the container.

A second fixation position is represented in FIG. 2 and is defined as the position wherein the set of protrusions 15 of the skirt 8 are snap fitted behind the set of protrusions 6b located distant from the containers body. In this second fixation position, the sealing of the opening 4 by the closure 2 is disrupted and that as such the space confined by the container 1 is in contact with the environment, thereby allowing overpressure relief.

Upon positioning the closure 2 in the first (sealing) fixation position and an overpressure arises in the container, the overpressure will force the closure 2 upward into the second fixation position, wherein the overpressure is released, without the closure being loosened from the container. As such a controlled system is obtained to handle the safety issue of overpressure occurring in the container 1.

Appropriate materials for both the container and the closure or at least the elements constituting the overpressure relief system are stainless steel or synthetic materials such as for example polyesters or polyolefins.

Figure 4A:
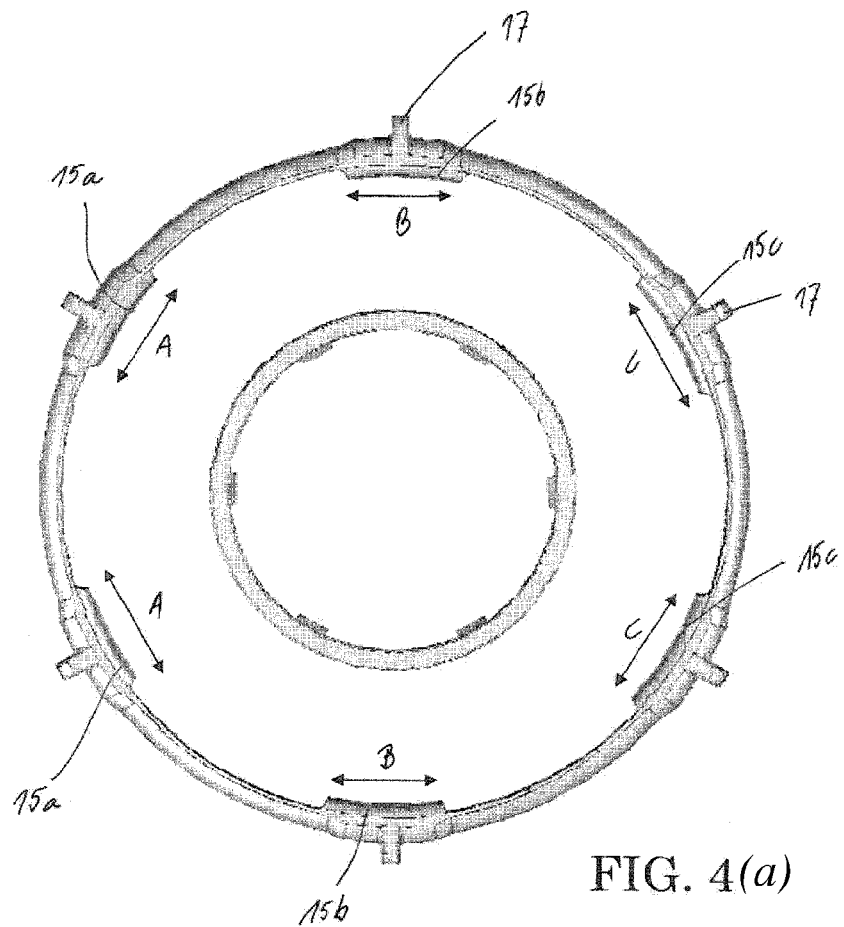
FIG. 4(a) represents a cross-section of the closure according to line Iv-Iv in FIG. 1.

In a preferred embodiment of the closure and as represented in FIG. 4, the members 14 or at least the protrusions 15 have a varying width. More particularly, the protrusions 15a located at one side of the closure have a width A, while the protrusions 15c at the opposite side of the closure have a width C, the protrusions 15b positioned in between having a width B, whereby A<B<C. The closure can hereby be provided with six members 14 and protrusions 15a, 15b and 15c, wherein two adjacent protrusions 15a have a width A, the two protrusions 15c located opposite said first protrusions have a width C and the intermediate protrusions 15b have a width B.

In this embodiment, at overpressure in the container, the fixation shift of the closure at overpressure will preferentially occur at the protrusions 15a with the smallest width A, such that the closure actually tilts in relation to the container. Equally, in this embodiment the sealing of the closure on the container is only disrupted over a section of the containers neck.

Figure 3A:
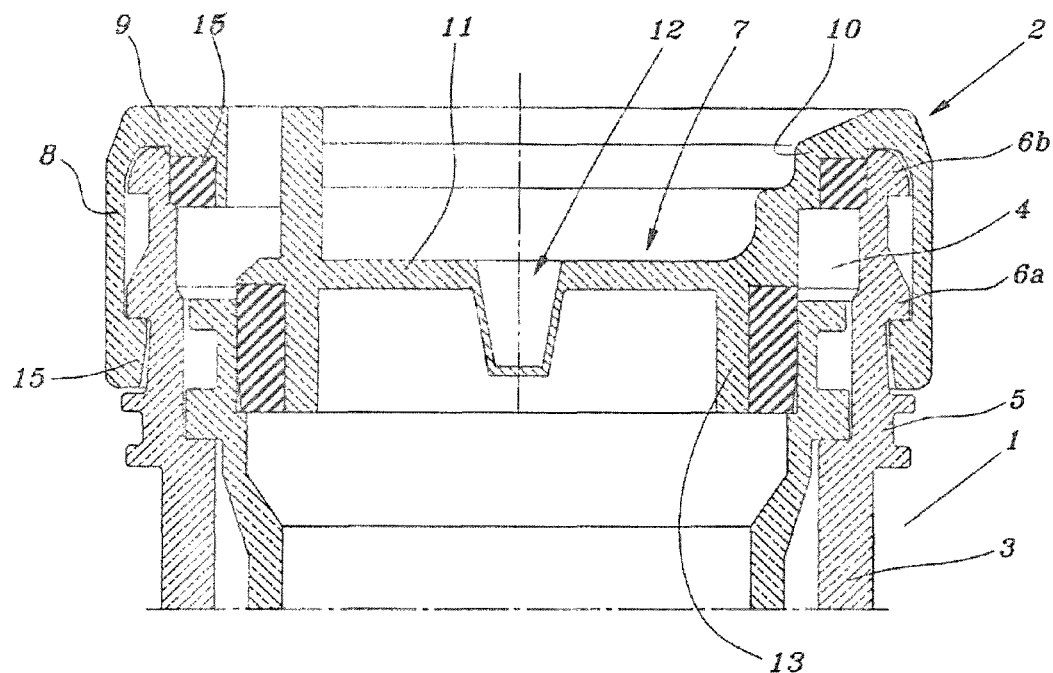
FIGS. 3(a)-3(b) represents cross sections corresponding to FIG. 1 for two alternative embodiments of the assembly according to the invention.

FIG. 3(a) represents an alternative embodiment, wherein the skirt 8 comprises a continuous cylinder, whereon the set of protrusions 15 is provided. In this embodiment, the different protrusions can either be distinct spaced-apart protrusions or can form a continuous ring.

Figure 3B:
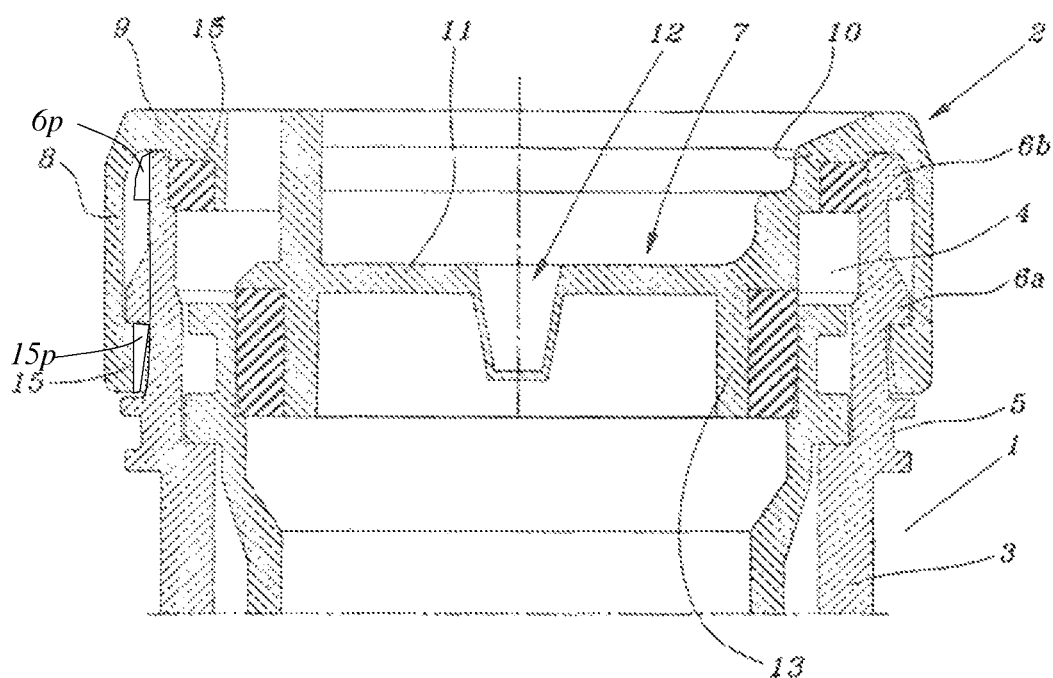
Figure 4B:
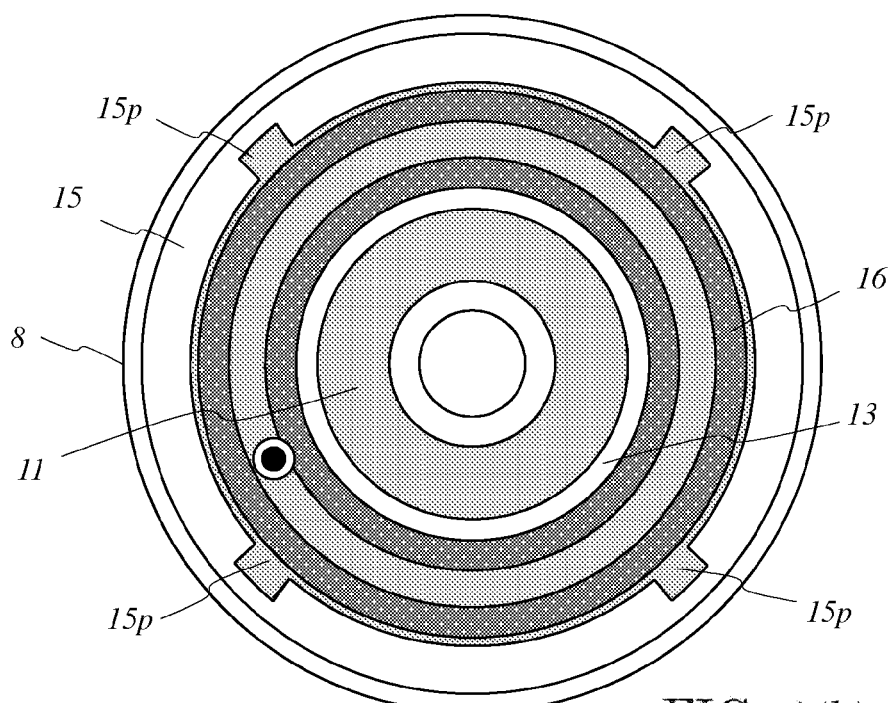
FIG. 4(b) depicts a bottom view of a closure according to FIG. 3(b)
Figure 5:
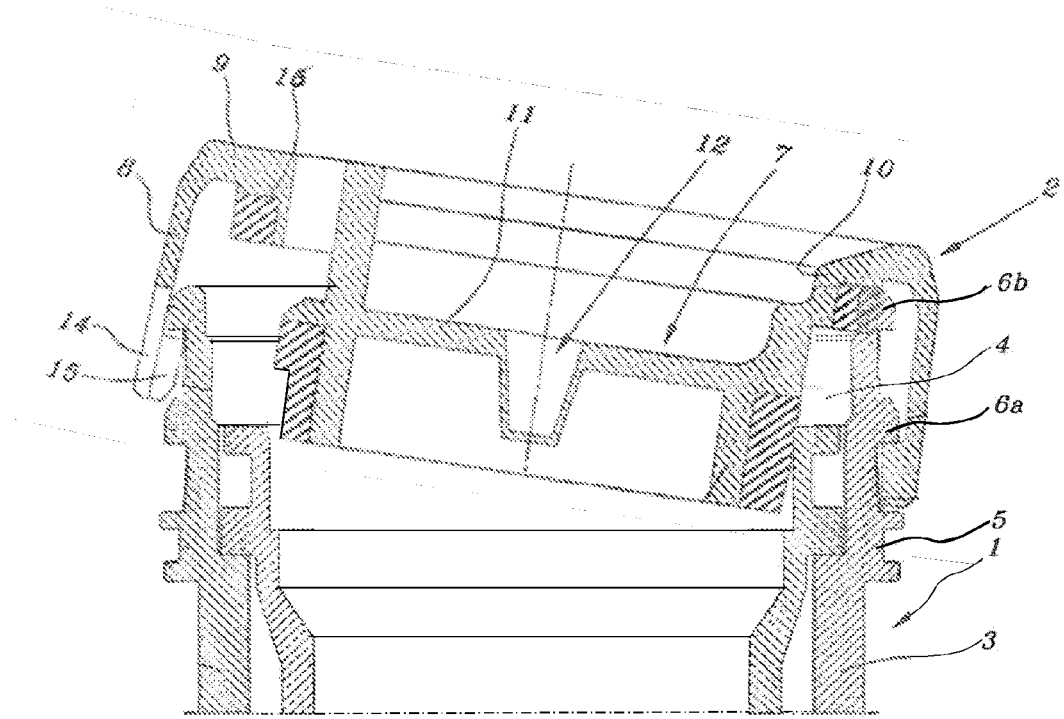
FIG. 5 illustrates the pressure relief mechanism in case of overpressure of an assembly according to FIG. 1.

In case the protrusions 15 form such a continuous ring and in the case the protrusion 6b located distant form the container 1 form a continuous rim, it is preferred that in either the ring or the rim or in both are provided some lateral grooves 6p, 15p that ensure contact between the space confined by the container and the environment when the closure 2 is positioned in the second fixation position (i.e. the position allowing overpressure relief). FIG. 3(b) illustrates such embodiment showing a groove 6p and 15p formed on the protrusions 6b and 15, respectively. FIG. 4(b) depicts a bottom view of a closure wherein the protrusions 15 form a continuous ring comprising lateral grooves 15p.

Configuring the skirt 8 as a continuous cylinder has the additional advantage that this skirt can be made very rigid, thereby allowing precise control of the force needed to move the closure from the first fixation position into the second fixation position.

In accordance with the above described embodiments, the neck portion 3 comprises at least two sets of protrusions 6a and 6b, while the closure is provided with at least one set of protrusions 15. In accordance with further embodiments the overpressure relief system can also comprise at least two sets of protrusions on the closure 2, and at least one set of protrusions on the neck portion 3, wherein during movement of the closure 2 from a first fixation position to a second fixation position, the same set of protrusions on the neck portion 3 disengages the first set of protrusions of the closure 2 and subsequently engages the second set of protrusions of said closure 2.

The above described assemblies according the invention are particularly suited for containers designed to contain carbonated beverages, such as for example beer.

The present invention is particularly suitable for containers of the type generally known as bag-in-containers. Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsable inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were—and still are—produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. No. 3,484,011, U.S. Pat. No. 3,450,254, U.S. Pat. No. 4,330,066, and U.S. Pat. No. 4,892,230.

In case the bag-in-box container is designed to receive a top chime, it is preferred to provide the skirt 8 of the closure 2 with a guided profile allowing an automated assembly of the chime over the closure and on the container. As represented in FIG. 4(*a*), such guided profile can for example be designed such as to comprise several longitudinally extending edges 17 provided at the outer surface of the closure skirt 8.

The present invention is by no means limited to the embodiments described above and represented in the accompanying figures; on the contrary, such an assembly of a container and a closure comprising an overpressure relief system can be made in various executions while still remaining within the scope of the invention.

The invention claimed is:

1. An assembly of a container and a closure, the assembly comprising an overpressure relief system, wherein the system comprises a fixation between the closure and a container, the fixation comprising two fixation positions in between which the entire closure is movable, wherein:
   the container comprises a neck portion that is provided with at least two sets of outwardly-extending protrusions, each set vertically spaced from one another on the container,
   the closure comprises a base and a skirt extending transversally with respect to the base, the skirt having several spaced apart members extending transversally with respect to the base of the closure, each member being provided with an inwardly-extending protrusion configured to engage at least one of the sets of protrusions on the neck portion of the container, and
   at least one of the inwardly-extending protrusions of the closure is located at one side of the closure and has a width A, and at least one of the inwardly-extending protrusions of the closure is located at an opposite side of the closure and has a width C, wherein A<C, and wherein the closure further comprises intermediate protrusions having a width B, wherein A<B<C.

2. The assembly according to claim 1, wherein said fixation comprises a first fixation position wherein the closure seals the opening of the container.

3. The assembly according to claim 2, wherein said fixation comprises a second fixation position wherein the sealing between the closure and the container is disrupted, thereby allowing pressure relief.

4. The assembly according to claim 1, wherein the skirt comprises a continuous cylinder, whereon the set of inwardly-extending protrusions is provided configured to snap fit the closure behind one of the sets of outwardly-extending protrusions on the containers neck portion.

5. A closure comprising a base part and a skirt extending transversally with respect to the base, the skirt comprising several spaced-apart members extending transversally with respect to the base of the closure, these members being provided with an inwardly directed protrusion, wherein the protrusions located at one side of the closure have a width A, the protrusions located at the opposite side of the closure have a width C wherein A<C, and wherein between the protrusions with width A and the protrusions with width C, protrusions are provided having a width B, wherein A<B<C.

6. A container and closure assembly, comprising:
   a container having an exterior surface defining a neck portion and an opening, the neck portion having a first annular protrusion and a second annular protrusion spaced from the first protrusion toward the opening; and
   a closure for engaging the neck portion and covering the opening, the closure having inward first and second inwardly-extending protrusion formed thereon, the closure being moveable relative to the container between a sealed position and a relief position, wherein in the sealed position the inward protrusion is engaged with the first annular protrusion to seal the container, and in the relief position the inward protrusion is engaged with the second annular protrusion to enable fluid communication between an interior of the container and an ambient environment;
   wherein the first protrusion extends inwardly from one side of the closure and the second protrusion extends inwardly from an opposite side of the closure, wherein the second protrusion has a width greater than that of the first protrusion, and wherein the closure further includes a third inwardly-extending protrusion having a width greater than that of the first protrusion and less than that of the second protrusion.

7. The assembly according to claim 6, wherein the first and second annular protrusions each include a shoulder for engaging with a ledge of the inward protrusion on the closure.

8. The assembly according to claim 6, wherein the closure further comprises a seal, wherein the seal is engaged with the container in the sealed position to inhibit fluid communication between the interior of the container and the ambient environment, and wherein the seal is disengaged from the container in the relief position to enable fluid communication between the interior of the container and the ambient environment outside of the container.

* * * * *